UNITED STATES PATENT OFFICE.

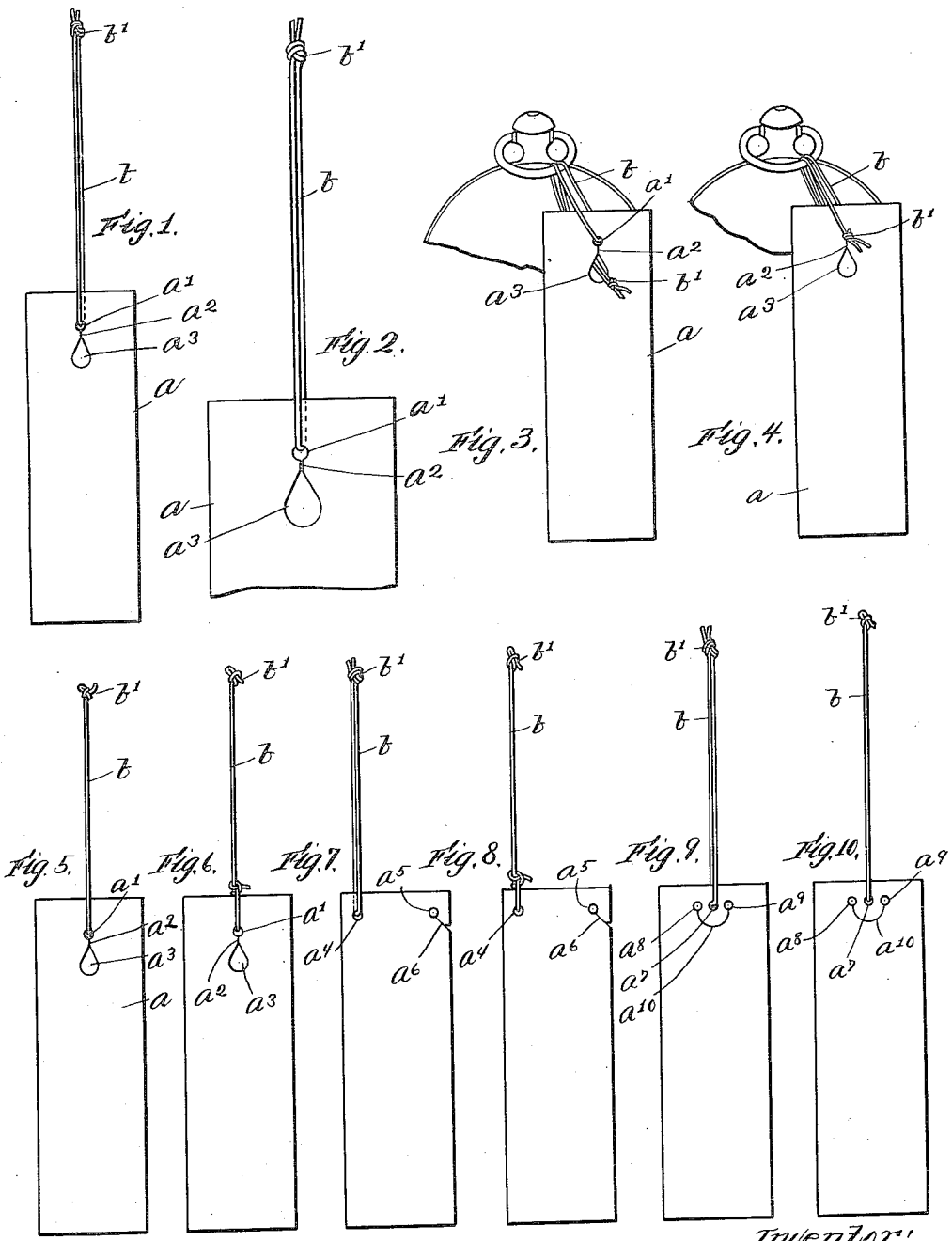

FRANK H. THOMPSON, OF SOUTH FRAMINGHAM, MASSACHUSETTS, ASSIGNOR TO DENNISON MANUFACTURING CO., OF SOUTH FRAMINGHAM, MASSACHUSETTS, A CORPORATION OF MASSACHUSETTS.

TAG.

971,804.   Specification of Letters Patent.   Patented Oct. 4, 1910.

Application filed June 11, 1909. Serial No. 501,568.

*To all whom it may concern:*

Be it known that I, FRANK H. THOMPSON, of South Framingham, county of Middlesex, State of Massachusetts, have invented an Improvement in Tags, of which the following is a specification.

This invention relates to improvements in tags having an attaching-loop, and the objects of the invention are first, to provide the tag with locking-means for the outer end of the attaching-loop, formed solely by cutting the tag, whereby a short attaching-loop may be employed, so that the tag will hang close to the object to which it is attached; second, to provide the outer end of the attaching-loop with a knot and to cut the tag in such manner as to especially adapt it to receive and hold the knotted end of said loop when the tag is attached to an object; third, to cut the tag in such manner as to enable the outer end of the attaching-loop to be easily and quickly brought into engagement with it; fourth, to provide the tag with locking-means formed therein by a cutting operation which permits the employment of either a double or single stranded attaching-loop.

Figure 1 is a plan view of a tag having an attaching-loop embodying this invention. Fig. 2 is an enlarged view of the same. Figs. 3 and 4 are views representing the manner of attaching the tag to an object, the ring of a watch being selected for the purpose of illustration. Fig. 5 is a similar view showing a modified form of attaching-loop. Fig. 6 is a similar view showing another modified form of attaching-loop. Fig. 7 is a plan view of a modified form of tag having an attaching-loop. Fig. 8 is a view of the tag shown in Fig. 7, having a modified form of attaching-loop. Fig. 9 is a plan view of another modified form of tag having an attaching-loop, and Fig. 10 is a view of the tag shown in Fig. 9, having a modified form of attaching-loop.

Referring to Figs. 1 to 6, $a$ represents the tag which is made of any suitable shape, size and material. $b$ represents the attaching-loop, which, in Figs. 1 to 4, consists of a double-stranded loop, and in Figs. 5 and 6 a single-stranded loop. Said attaching-loop is connected at its inner end to the tag and its outer end is free or unattached and adapted to be passed through the ring of a watch or through a hole in an object, and carried back and connected with the tag, thereby forming the loop. The attaching-loop $b$, shown in Figs. 1 to 4, consists of a cord which is passed through an aperture $a'$ in the tag, and its ends tied together to form a knob $b''$; and in Fig. 5 the cord has a knot, not shown, at its inner end, and is slidable through the aperture $a'$ in the tag, which is smaller than the knot, and its has a knot $b'$ at its outer end; and in Fig. 6, the cord is passed through the aperture $a'$ and is tied to the bag, and it has a knot $b'$ at its outer end.

The locking means for the outer knotted end of the attaching-loop is formed cheaply by simply cutting the tag, and as shown in Figs. 1 to 6, the aperture $a'$ is utilized, it being made smaller than the knot $b'$, but large enough to permit a free sliding movement of the strands composing the loop; and another aperture $a^3$, which is made larger than the knot $b'$, is cut in the tag near the aperture $a'$, and said apertures $a'$ and $a^3$ are connected by a slit $a^2$. The outer knotted end of the attaching-loop is passed through the large aperture and then the cord is drawn along the slit into the small aperture, and then by pulling upon the loop, thus formed, the knot $b'$ will be brought up against the tag at the small aperture thereof and is thus held. The slit $a^2$ serves as an entrance passage to the aperture $a'$ and by forming it by simply cutting the tag a passage with self-closing side walls is produced, which walls are adapted to yield to permit the cord to be drawn between them and then spring back. The large aperture $a^3$ is formed with converging sides which terminate at the entrance to the passage $a^2$ to assist in guiding the attaching-loop into said passage.

Referring to Figs. 7 and 8 the tag has an aperture $a^4$ for connection therewith of the inner end of the attaching-loop, and is cut to form an aperture $a^5$ smaller than the knot $b'$, and a self-closing passage $a^6$, which serve as locking-means for the outer end of the attaching-loop, said aperture $a^5$ and passage $a^6$ corresponding to the aperture $a'$ and passage $a^2$ shown in Figs. 1 to 6.

Referring to Figs. 9 and 10 the tag has an aperture $a^7$ for connection therewith of the inner end of the attaching-loop, and has apertures $a^8$, $a^9$, smaller than the knot, and a self-closing passage $a^{10}$ connecting said apertures $a^8$ and $a^9$.

Having thus described my invention, what I claim as new and desire to secure by Letters Patent is:—

1. A tag, an attaching-loop connected at its inner end to the tag and having a knot at its outer end, said tag having an aperture made larger than the strand composing the loop, to permit a free sliding movement of the loop therein, but smaller than the knot, to prevent the knot passing through it when drawn into engagement with the tag, and having a self-closing passage leading to said aperture, substantially as described.

2. A tag having a small aperture and a large aperture, and a communicating passage between said apertures, and an attaching-loop connected at its inner end to the tag, at the small aperture therein, having a knot at its outer end which is made smaller than the large aperture and larger than the small aperture, whereby said knotted end may be passed through the large aperture and drawn along the communicating passage into the small aperture, and prevented from withdrawal by the knot engaging the tag at the small aperture, substantially as described.

3. A tag having two apertures, one larger than the other, and a connecting slit, a cord passing through the small aperture having its ends tied together to form a knot, the large aperture permitting the passage through it of the knotted end thus formed and having its sides converging toward said slit and terminating thereat, thus forming an angle for guiding the cord into said slit, and said slit having side portions which yield to permit the passage of the cord through it into the small aperture and spring back into place to prevent its accidental retraction, and said small aperture being made smaller than the knot, substantially as described.

In testimony whereof, I have signed my name to this specification, in the presence of two subscribing witnesses.

FRANK H. THOMPSON.

Witnesses:
   LYNETTE CLARK,
   JOHN H. TEMPLE.